United States Patent [19]

Priluck

[11] Patent Number: 5,679,467
[45] Date of Patent: Oct. 21, 1997

[54] LATTICE BLOCK MATERIAL

[76] Inventor: Jonathan Priluck, 37 Antwerp St., Brighton, Mass. 02135-1326

[21] Appl. No.: 664,687

[22] Filed: Jun. 17, 1996

Related U.S. Application Data

[63] Continuation-in-part of Ser. No. 312,224, Sep. 26, 1994, Pat. No. 5,527,590, which is a continuation-in-part of Ser. No. 33,111, Mar. 18, 1993, abandoned.

[51] Int. Cl.$^6$ ........................................... B32B 9/00
[52] U.S. Cl. .......................... 428/596; 428/192; 428/193; 428/194; 428/196; 428/198; 428/229; 428/251; 428/256; 428/598; 428/615; 245/2; 140/5; 140/6; 140/7; 140/92.1; 52/637; 52/638; 52/643; 52/646; 52/657; 52/693
[58] Field of Search ............................ 428/193, 192, 428/198, 196, 194, 256, 251, 229, 598, 615; 52/646, 657, 660, 664, 637, 638, 643, 693; 245/2; 140/5, 6, 7, 9, 92.1, 92.2

[56] References Cited

U.S. PATENT DOCUMENTS

| | | | |
|---|---|---|---|
| 2,068,675 | 1/1937 | Heller | 140/92.2 |
| 3,298,402 | 1/1967 | Hale | 140/5 |
| 5,527,590 | 6/1996 | Priluck | 428/198 |

*Primary Examiner*—Patrick Ryan
*Assistant Examiner*—Abraham Bahta
*Attorney, Agent, or Firm*—Damon J. Borrelli

[57] ABSTRACT

Disclosed is a structural material having a lattice configuration. In one embodiment of the invention, the structural material is manufactured by weaving a continuous wire filament on a loom assembly. In an alternative embodiment of the invention, the structural material is formed using substrate sheets that are machined or molded into a desired configuration. The structural material of the invention can be used alone or layered to form a multi-laminate material.

12 Claims, 6 Drawing Sheets

LATTICE BLOCK MATERIAL

CROSS-REFERENCE TO RELATED APPLICATION

This application is a continuation-in-part of U.S. patent application Ser. No. 08/312,224, filed Sep. 26, 1994, now U.S. Pat. No. 5,527,590 which is a continuation-in-part of U.S. patent application Ser. No. 08/033,111, filed Mar. 18, 1993, now abandoned.

BACKGROUND OF THE INVENTION

1. Field of the Invention

The present invention relates to structural materials and a method for their manufacture. More particularly, the invention is directed to a structural material having a multi-dimensional lattice configuration and a method for its fabrication.

2. Description of the Prior Art

The search for lighter and stronger materials has been a major focus in the field of material science for many years. To date, research in this area has primarily focused on the use of metals, plastics, and ceramics. This research has resulted in the improvement of existing technologies. In addition, it has produced new materials and processes to satisfy the changing engineering and economic needs of modern society.

More recently activity in the area of materials science, as regarding superior strength-to-weight characteristics, has primarily focused on hydrocarbon based polymers and related chemical processes. Although the materials and methods developed by this research can be both useful and effective under selected conditions, they do not typically address the problem of improving higher-order structures. Further, the goal of many of these materials and processes remains the reproduction of metallic mechanical characteristics using carbon-based chemical formulation techniques. As a result, many of these materials provide only nominal improvement over other more readily available metallic structural materials.

A need has arisen for a high-strength, light-weight structural material which can be manufactured at economically feasible rates and costs.

SUMMARY OF THE INVENTION

It is an object of the present invention to provide a high-strength light-weight structural material.

It is a further object of the invention to provide a light-weight structural material configured as a multidimensional lattice.

It is another object of the invention to provide a method for the manufacture of a high-strength, light-weight structural material.

It is a yet another object of the invention to provide a method for the manufacture of a high-strength, light-weight structural material configured as a multidimensional lattice.

The structural material of the present invention is characterized by a lattice. In one embodiment of the invention, the lattice is manufactured from a series of wires. The wires are typically welded together in order to fix them in position. Alternatively, the material of the invention can be manufactured from a substrate in the form of a rectilinear sheet.

The lattice of the invention is configured in the shape of uniformly stacked pyramids in a three dimensional array. When wires are used to produce the lattice of the invention, each pyramid is composed of eight wire segments joined together at their vertices. These wire segments are typically part of a continuous wire filament. Although, the configuration of the material is such that it appears solid to the naked eye, it is, in fact, composed of a three-dimensional network of minute wires. These wires are typically brass or stainless steel. Preferably, the material is composed of structural members about 0.005 to 0.01 inches in diameter and 0.03 to 0.09 inches long.

The lattice of the invention can also be manufactured from a substrate in the form of, for example, a rectilinear sheet. The composition of the substrate sheet can be virtually any material exhibiting the desired structural strength and integrity necessary for a given application in which the lattice of the invention is employed.

When a substrate in the form of a sheet is utilized, the substrate sheet typically is machined, for example, photo-etched or modified using a milling machine or other similar apparatus, in order to produce a desired configuration. Alternatively, depending on the composition utilized, the sheet can be produced by using a mold designed to produce a predetermined configuration for the substrate sheet. Generally, the pattern produced by any of these methods is selected such that when the substrate sheets are placed in juxtaposition a lattice configuration in the shape of uniformly stacked pyramids in a three dimensional array results. Like the wire-based material, the configuration of the material of the invention when manufactured from a series of substrate sheets is such that it appears solid to the naked eye. It is, in fact, composed of a three-dimensional network of the sheet material. The substrate sheet can be virtually any material. Stainless steel is preferred.

The material of the present invention is approximately one fifth as dense as solid steel, yet comparable in strength. These characteristics result from a multiplicity of factors. For example, forces on the material are transferred in the same manner as forces on a conventional size truss or space frame. Further, the small cross-sectional area of the wires or substrate sheet results in a high surface to volume ratio. In addition, isolation of elements reduces the propagation of flaws through the material as well as assisting in the even transfer of loads. Finally, the low cross-sectional size of the wires or substrate sheets used to produce the material, preferably less than about 0.01 inches, results in superior strength characteristics and inhibits crack propagation.

The invention also contemplates several methods of manufacture. Under a first methodology, the process of the invention includes providing a rig capable of receiving a series of slide blocks and a loom in which the slide blocks can be positioned. Next, fine wires are mounted on the loom and then weaved. Following weaving the wires are welded together. The resulting sheets can then be used as desired or shaped as necessary to produce a corrugated material. In an alternative embodiment of the method of the invention, the material of the invention can be produced in elongate sections using an appropriate support and welding assemblies. These elongate sections can then be corrugated or shaped as desired. Individual steps of these methods of the invention are discussed in detail below. Finally, machining and molding processes can be used to produce the material of the invention.

Referring to a first method of the invention, in the first step a rig and several slide blocks are assembled. These apparatuses serve to hold the wires under tension and in the proper configuration prior to welding. The rig is a generally flat ring having three sets of opposing tracks with T-slots set at 120 degree intervals. The slide block assemblies, which are sized and shaped to fit in the tracks of the rig, have a series of parallel grooves to captivate the wires and hold them precisely in place.

In the next step, the loom, consisting of three grooved uprights on a rotating trigonal platform, is prepared. More particularly, the loom is prepared such that it includes three uprights having locating surfaces onto which the slide block assemblies are locked before the wire is drawn off the spool. As the loom, and hence uprights, rotate the wire progresses down the grooves of the slide blocks so that after one revolution the wire passes into the next lowest groove.

Once positioned on the loom, the wire is cut adjacent to the slide blocks. Next, the slide blocks are mounted on the previously prepared rig so as to form a wire grid or matrix. The vertices of the wire matrix, i.e., the point at which the wires overlap, are then connected utilizing a forging-press. The forge-press supplies uniform heat and pressure to all the joints at once in order to achieve a weld at each vertex. Once all the vertices are joined, the material can be removed from the slide blocks and rig.

The flat material produced using the process of the invention can be used in isolation as a structural material. Alternatively, the resulting material can be bent using a press, punch and die, or by passage through a set of saw-toothed rollers to form corrugated sheets. This latter material can be stacked with, and joined to, alternating flat sheets of the material to form a thicker three dimensional material.

To commence the alternative method of the invention, a first set of wires is positioned on a second support rig. Next, a wire is positioned on a first support rig. The first and second support rigs are then moved into juxtaposition such that the wires on the second rig are oriented at a relative angle of about sixty (60) degrees to the wire on the first rig. At the points of intersection, the wires on the second rig are welded to the wire on the first rig. Welding can be done wire-by-wire, or in groups, as desired. When welding is completed, the wires in the second rig are pulled forward so that the wire in the first rig can be moved into an adjacent groove. A second wire is then placed in the first rig and the welding procedure repeated. This procedure continues until a sub-assembly of desired size including two sets of welded wires is produced.

In the next phase of this method of the invention, a third set of wires is welded to the two wire sub-assembly discussed above. Once again, a wire is positioned on the first support rig. The first and second support rigs are then moved into juxtaposition such that all of the wires are oriented at relative angles of about sixty (60) degrees. That is, so that a series of equilateral triangles are formed. At the points of intersection, the wires are again welded together. As noted above, welding can be done wire-by-wire, or in groups, as desired. When welding of the wires is completed, the finished material is released from the support rigs.

The material produced using the alternative method of the invention can also be used in isolation as a structural material. Alternatively, the resulting material can be bent using a press, punch and die, or by passage through a set of saw-toothed rollers to form corrugated sheets. This latter material can be stacked with, and joined to, alternating flat sheets of the material to form a thicker three dimensional material.

Still alternatively, the method of the invention contemplates producing the lattice of the invention using methods incorporating photo-etching, machining, or molding subprotocols. As noted above, these procedures are typically utilized in order to modify or produce a substrate rectilinear sheet that is, in turn, used to produce the lattice of the present invention.

In the case of photo-etching and machining, a substrate sheet having preselected dimensions is treated in order to produce a desired pattern of apertures. These apertures can have virtually any configuration, e.g., oval, square, trigonal, or circular, depending on the given application in which the lattice of the invention is to be utilized. The substrate sheets produced using these methods of the invention can be used in isolation as a structural material. Alternatively, the resulting material can be bent using a press, punch and die, or by passage through a set of saw-toothed rollers to form corrugated sheets. If desired, this latter material can be stacked with, and joined to, alternating flat substrate sheets to form a thicker material. Alternatively, the sequential bent substrate sheets can be stacked and joined together to form the desired lattice of the invention.

Finally, in the case of molding of the substrate sheets, a preselected composition is heated and then extruded, injection molded, or poured to produce the substrate sheet material. By carefully designing the configurations of the molds utilized in these processes, a substrate sheet having virtually any configuration can be produced so as to satisfy the structural requirements of virtually an application in which the lattice of the invention is to be utilized. For example, both flat and bent substrate sheets can be produced during the pouring or molding processes. The substrate sheets produced using a molding protocol can be used in isolation as a structural material. Alternatively, layers of the resulting material can be stacked to form a thicker three dimensional material.

Other general and specific objects of the invention will in part be obvious and will in part appear hereinafter.

The invention accordingly comprises the method and apparatus embodying steps, features of construction, combinations of elements, and arrangements of parts adapted to effect such steps, as exemplified in the following detailed disclosure, the scope of the invention is indicated in the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Referring to FIGS. 1 through 8 wherein like reference numerals refer to like parts, there is illustrated a structural material 10 embodying the present invention. The structural material 10 can be fabricated from a lattice of supports 12 joined at their vertices 14. The supports 12 can be formed from fine wire segments which are sections of a continuous wire filament 16. Alternatively, the structural material 10 can be fabricated from a substrate sheet. In this later case, the supports 12 are sections of the larger substrate sheet.

Figure 1:
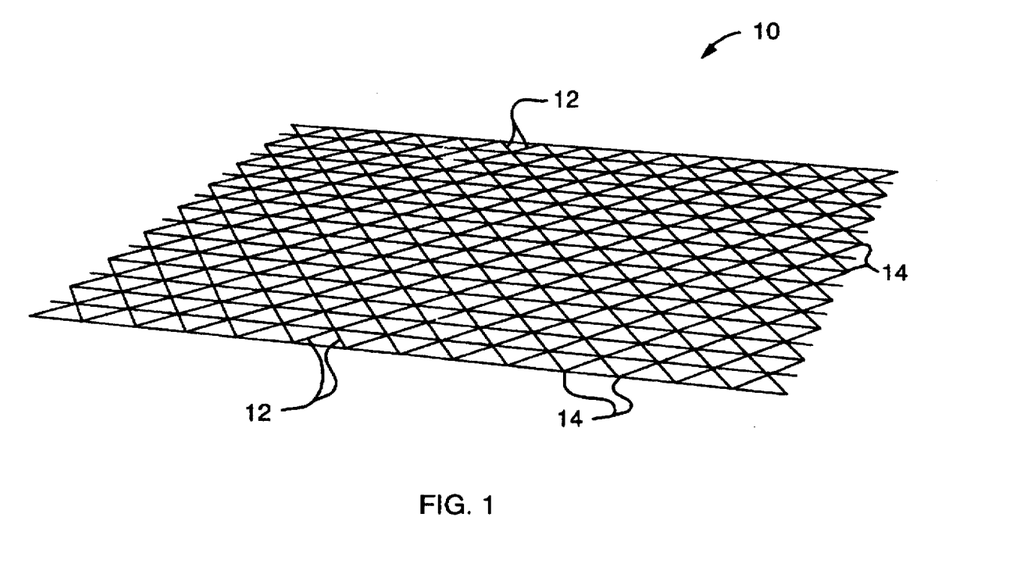
FIG. 1 is a perspective view of one embodiment of the structural material of the invention.
Figure 2:
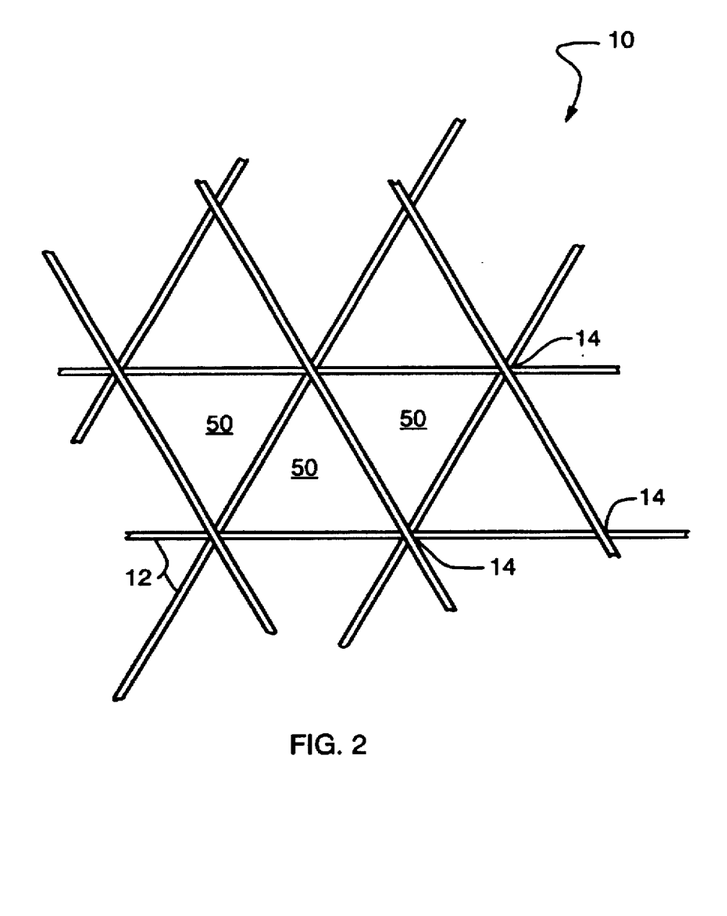
FIG. 2 is a magnified top plan view of a section of the structural material of FIG. 1.
Figure 3:
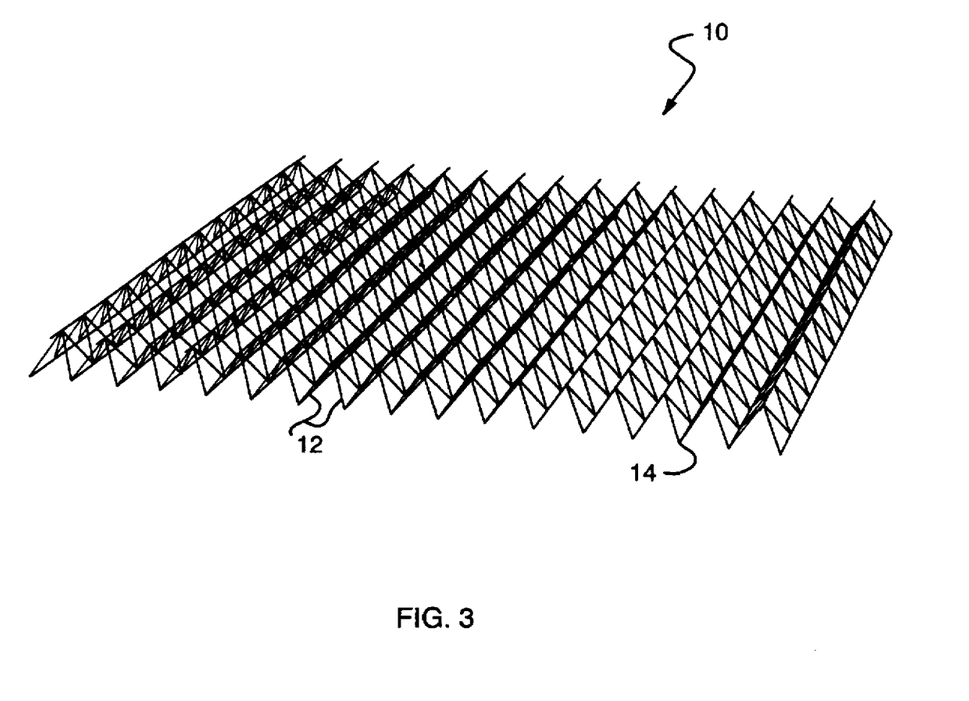
FIG. 3 is a perspective view of another embodiment of the structural material of the invention having a corrugated cross-sectional configuration.
Figure 4:
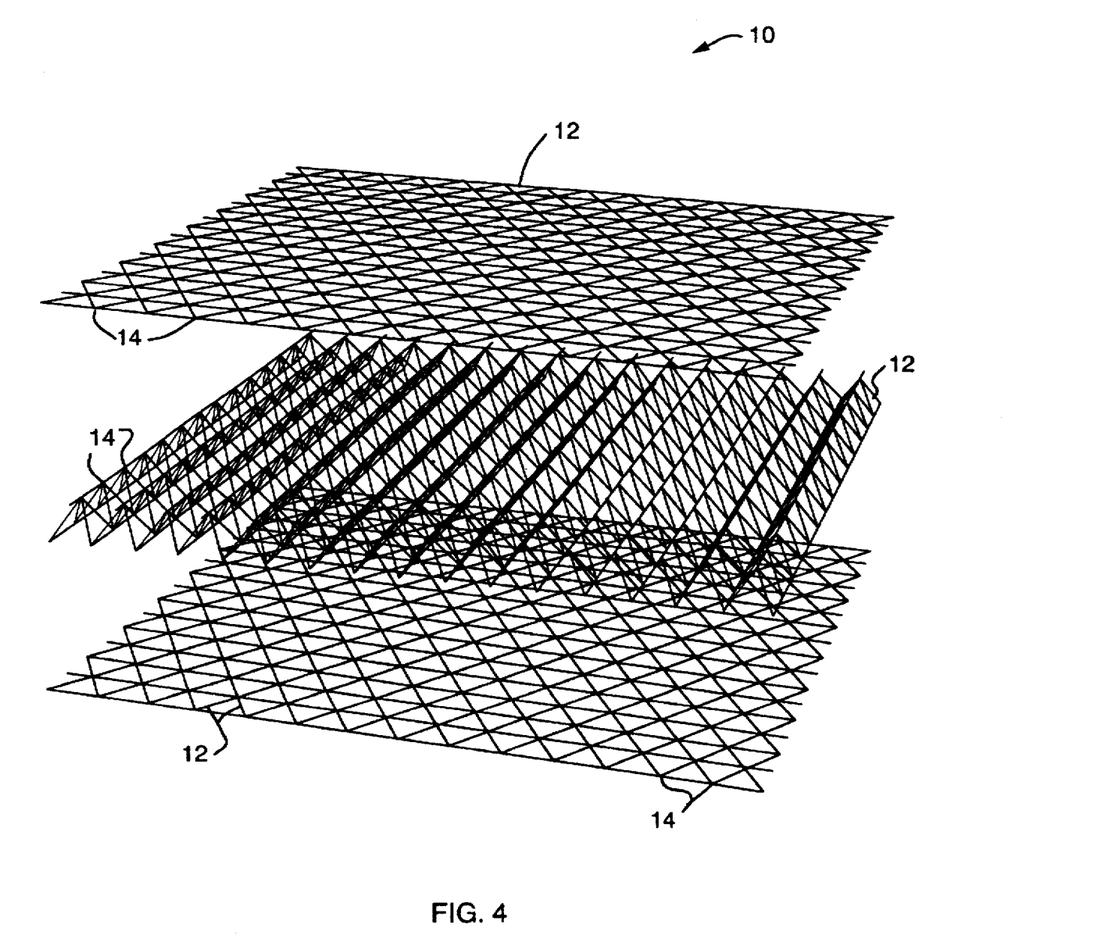
FIG. 4 is a perspective, exploded view of another embodiment of the structural material of the invention having alternating layers of the embodiments of the invention shown in FIGS. 1 through 3.
Figure 5:
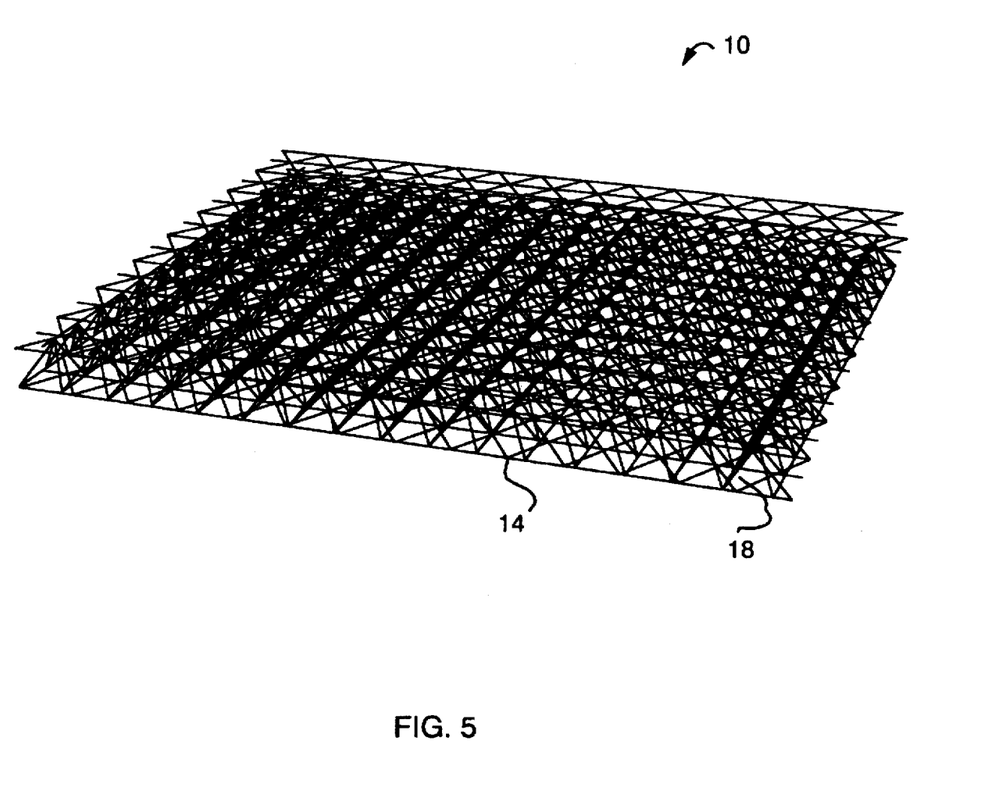
FIG. 5 is perspective, assembled view the embodiment of the structural material of the invention shown in FIG. 4.

As shown in FIGS. 1 through 5, supports 12 can be employed to produce the structural material 10 of the invention. The supports 12 can be fine wire segments. Alternatively, as discussed in detail below a substrate sheet can be used to produce the structural material 10. As shown in FIGS. 1 through 3, the structural material 10 can be planar or corrugated depending on the engineering application intended. In larger, more complex embodiments of the invention, as shown in FIGS. 4 and 5, the structural material 10 has a multi-laminate configuration consisting of uniformly stacked pyramids 18 in a three dimensional array. Each pyramid 18 is composed of supports 12 joined together at their vertices 14. The supports 12 can be manufactured from virtually any material. When fine wire segments are used to produce the supports 12, typically brass, stainless steel, or EDM wire is employed. Preferably, the fine wires used to form the supports 12 are between 0.005 and 0.01 inches in diameter. Further, the wire segments forming the supports 12 are typically between 0.02 and 0.1 inches long. A presently preferred wire material has a diameter of 0.008 and is manufactured from stainless steel.

As noted above, the structural material 10 of the invention can also be manufactured from a substrate typically in the form of a sheet. When a substrate sheet used, the supports 12 can, in one embodiment of the method of the invention, be produced by removing material from a continuous substrate sheet. Alternatively, molding processes can be used in the method of the invention to form the substrate sheet in virtually any desired configuration. The composition of the substrate sheet material can be virtually any material exhibiting the desired structural strength necessary for a given application in which the material 10 of the invention is employed.

When a substrate in the form of a sheet is utilized, the substrate sheet typically is machined, for example, photo-etched or modified using a milling machine or other similar apparatus, in order to produce a given configuration of supports 12 in the substrate sheet material. Alternatively, depending on the composition of the substrate sheet, the composition can be molded with a predetermined pattern to produce the desired shape for the substrate sheet. Generally, the pattern produced by any of these methods is selected such that when the substrate sheets are placed in juxtaposition a series of supports 12 forming a lattice configuration in the shape of uniformly stacked pyramids 18 in a three dimensional array results. Like the wire-based material, the configuration of the structural material 10 of the invention when manufactured from a series of substrate sheets is such that it appears solid to the naked eye. It is, in fact, composed of a three-dimensional network of the sheet material. The substrate sheet can be virtually any material. Stainless steel is preferred.

The invention also contemplates several alternative methods for the manufacture of the structural material 10. A first method uses rig 22 and loom 26 assemblies described in detail below. An alternative method uses support rigs 70 and 72, depicted in FIGS. 8A and 8B, to produce the material of the invention.

To commence a first method for the manufacture of the material of the invention, a rig 22 is provided that is adapted to receive a series of slide blocks 24. In addition, a loom 26 in which the slide blocks 24 can be positioned during initial weaving is prepared. In the next step of the process of the invention, a continuous wire filament 16 is mounted for weaving. The wire filament 16 is then drawn into the loom 26 and weaved as required. Following weaving the wire filaments 16 are positioned on the rig 22 and connected, typically welded, at the vertices 14 of the wire segments 12. The resulting sheets can then be used as desired or shaped as necessary to produce a multi-laminate material. Individual steps of the procedure of the invention are discussed in detail below.

In the first step of the procedure of the invention the rig 22 and slide blocks 24 are assembled. Shown in FIGS. 6 and 7, these apparatuses serve to hold the wire filaments 16 under tension and in the proper orientation prior to welding. Generally, the rig 22 is a flat ring 28 having three sets of opposing tracks 30 including T-slots 35. The tracks 30 are set at intervals of 120 degrees. This angle is selected so that when three sets of slide blocks 24 having wire filaments 16 extending therefrom are positioned in the rig 22 the intersecting wire segments 12 form a multiplicity of equilateral triangles.

Figure 6:
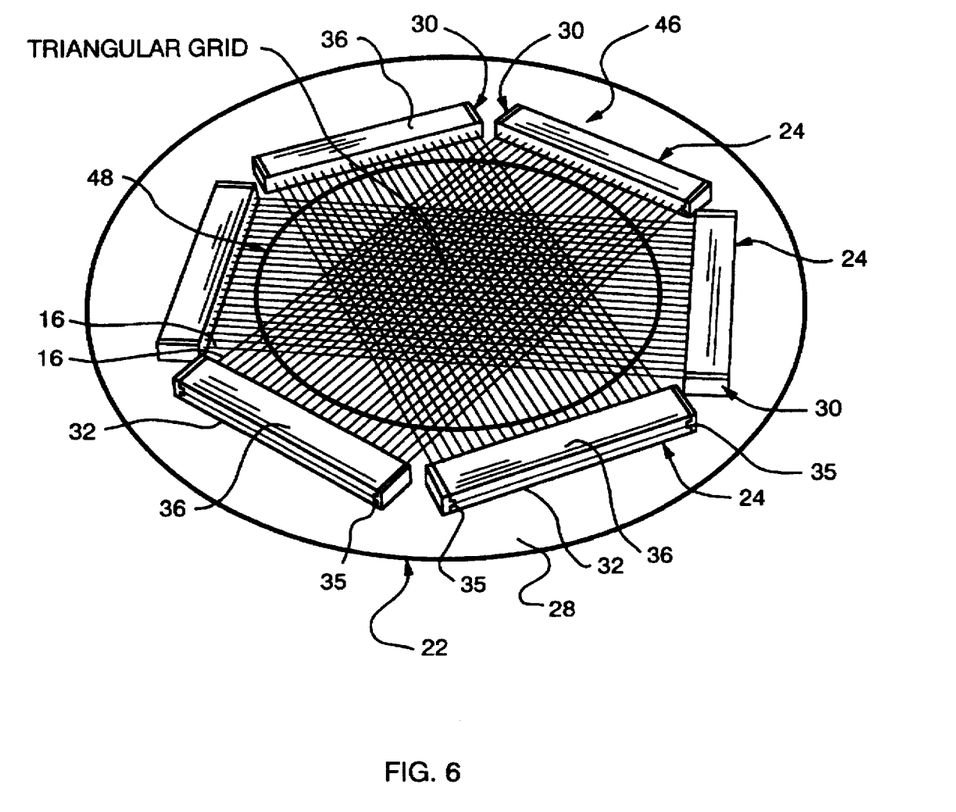
FIG. 6 is a perspective view of the rig, used to manufacture the structural material of the invention by employing a first method of the invention, with the slide blocks and wire filaments in position for forging.
Figure 7:
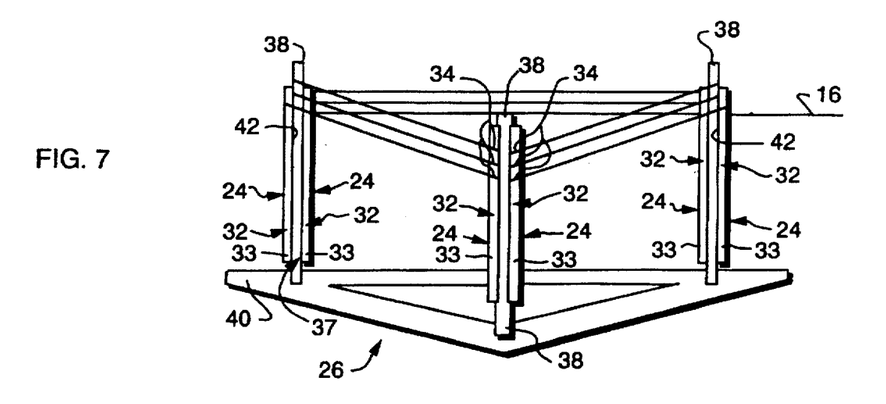
FIG. 7 is a perspective view of the loom, used to manufacture the structural material of the invention by employing a first method of the invention, with the wire filament weaved onto a section of the slide blocks.

The slide blocks 24 each have a first portion 32 including a surface 33 having series of parallel grooves 34 to captivate the wire filaments 16 and hold them precisely in place. A second face 37, located on the obverse of each of the slide blocks 24 is configured to be mountable on the uprights 38 of the loom 26 described in detail below. Each slide block 24 also includes a second portion 36 configured to fit over the first portion 32. The second portion 36 is sized and shaped to interferringly engage the wire filaments 16 when the weaving described below is completed. The first and second portions 32 and 36 can be connected using, for example, machine screws, bolts, and other fasteners familiar to those skilled-in-the-art.

Next, the loom 26, depicted in FIG. 7, consisting of three uprights 38 on a rotating trigonal platform 40, is prepared. Each upright 38 has a locating surface 42 onto which the first portions 32 of the slide blocks 24 are fixed before the wire filament 16 is drawn into the loom 26. The locating surfaces 42 on uprights 38 are configured to secure the slide blocks 24 with their grooved surfaces 33 facing outwardly. In operation, each of the second faces 37 of the first portions 32 of the slide blocks 24 is placed in contact with a surface of one of the uprights 38 to prepare the loom 26 for weaving. The slide blocks 24 can be secured to the uprights 38 using, for example, machine screws, bolts, and other fasteners familiar to those skilled-in-the-art.

In the next step of the method of the invention, loom 26, and hence uprights 38, are rotated so as to draw the wire filament 16 over the grooves 34 of the slide blocks 24. In particular, the loom 26 is rotated such that after one revolution the wire filament 16 passes into the next lowest groove 34 of each slide block 24. This procedure continues until all of the grooves 34 of the slide blocks 24 contain a portion of the wire filament 16. During weaving the wire filament 16 is preferably maintained at a tensile stress of between about 0.05 and 0.2 ounces. By following this procedure, between each of the uprights 38 is formed a parallel array of the wire filament 16.

Once the wire filament 16 is positioned on the loom 26 in the parallel array, the second portion 36 of each of the slide blocks 24 is placed over each the first portions 32. The wire filament 16 is thus fixed in position for further processing. Subsequently, the wire filament 16 is cut. More particularly, the wire filament 16 is cut along the uprights 38 using, for example, a welding torch. This action creates three independent sections 46 including a slide block 24 on either end of a wire section 48. The slide blocks 24 are then released from the locating surfaces 42 and moved to the rig 22.

In the next step of the method of the invention, the slide blocks 24 and wire sections 48 are mounted on the rig 22 and the wire sections 48 are interconnected utilizing a forging-press. In particular, the slide blocks 24 are positioned in the T-slots 35 of tracks 30. Like the T-slots 35, slide blocks 24 and wire sections 48 are mounted on the rig 22 at relative angles of 120 degrees. Positioning in this way creates a trigonal grid of wire segments 12 having the configuration of a multiplicity of equilateral triangles 50. Each triangle 50 shares three vertices 14 with those triangles 50 adjacent to it. Once all of the wire segments 12 are properly oriented, a forge-press familiar to those schooled-in-the-art is utilized to supply heat and pressure to all the vertices 14 at the same time. Preferably, the press provides about 50 pounds of pressure per square inch and 1250 degrees Fahrenheit heat. Welding of the wire segments 12 is preferably done under a vacuum. Once all the vertices 14 are joined, the resulting structural material 10 can be removed from the rig 22 and, eventually, slide blocks 24.

Figure 8A:
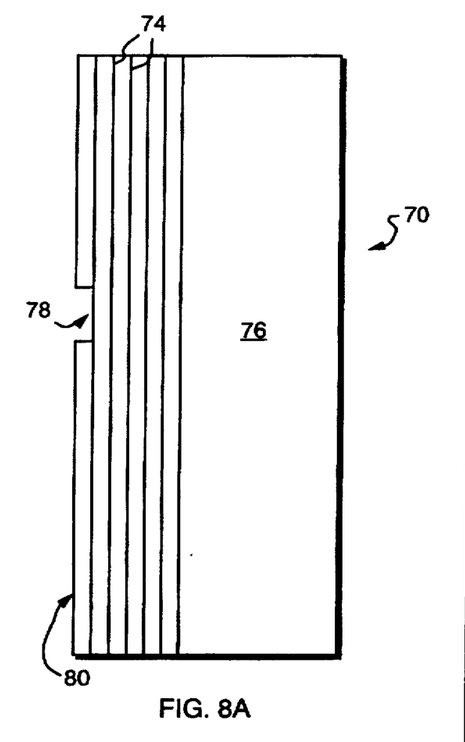
FIGS. 8A and 8B are top plan views of first and second support rigs used to manufacture the structural material of the invention by employing the alternative method of the invention.
Figure 8B:
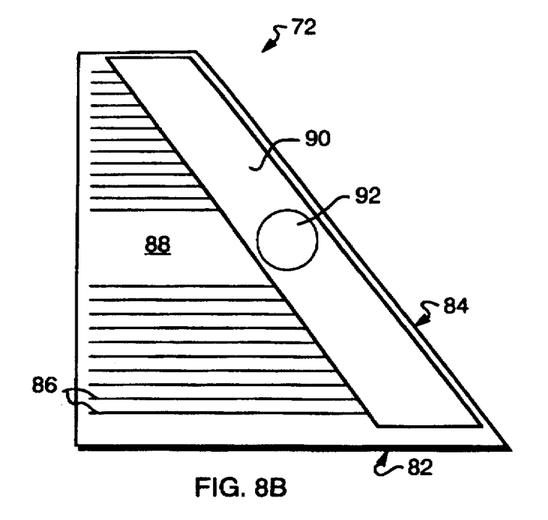

FIGS. 8A and 8B depict support rigs 70 and 72 that can be used in an alternative method of the invention to manufacture the material of the invention.

Referring to FIG. 8A, the support rig 70 has a generally rectangular configuration. A series of grooves 74 are cut into the surface 76 of the rig 70. Those skilled-in-the-art will appreciate that the size of the grooves 74 is determined by the size of wire being used to construct the material, and lattice, of the invention. The grooves 74 are equally spaced over surface 76. Generally, the separation distance between the grooves 74 is determined by the desired characteristics of the material, and lattice, being constructed. Typically, the grooves 74 are separated by between about 0.03 and about 0.07 inches. Preferably, the grooves 74 are separated by about 0.05 inches. The grooves 74 are parallel. A slot 78 is lanced into an edge 80 of the rig 70 to provide access for a welding electrode (not shown).

Referring to FIG. 8B, the support rig 72 has a polygonal configuration with at least two sides 82 and 84 being oriented at an angle relative to each other. The angle between sides 82 and 84 of the support rig 72 is selected such that when wires are positioned on the rig 72 they will be oriented at about sixty (60) degrees relative to a wire placed on support rig 70. The rig 72 also has a series of grooves 86 cut into one of its surfaces 88. Once again, those skilled-in-the-art will appreciate that the size of the grooves 86 is determined by the size of wire being used to construct the material, and lattice, of the invention. The grooves 86 are equally spaced over surface 88. The separation distance between the grooves 86 is determined by the desired characteristics of the material, and lattice, being constructed. Typically, the grooves 86 are separated by between about 0.03 and about 0.07 inches. Preferably, the grooves 86 are separated by about 0.05 inches. The grooves 86 are parallel. A flange 90, held in position by screw 92, extends across a portion of the surface 88 of the support rig 72. In operation, the flange 90 and screw 92 cooperate to secure the wires positioned on the rig 70.

To commence the alternative method of the invention, a first set of wires is positioned in the grooves 86 of the rig 72. Once positioned, flange 90 is placed over the wires and secured using the screw 92. Next, a wire is positioned in the groove 74 closest to the edge 80 of the rig 70. The first and second rigs 70 and 72 are then moved into juxtaposition such that the wires overlap and are oriented at a relative angle of about sixty (60) degrees. Preferably, wires held in rig 72 overlap the wire held in rig 70. At the points of intersection, the wires are then welded together. Welding can be done wire-by-wire, or in groups, as desired.

When welding of the wires held in the rigs 70 and 72 is completed, the wire sub-assembly is moved such that the wire in the rig 70 rests one groove 74 in from the edge 80. A new wire is then positioned in the groove 74 closest to the edge 80 and the welding procedure commences again. In this manner successive wires held in the first rig 70 are attached to the wires held in the second rig 72.

In the next phase of the method of the invention, a third set of wires is attached to the sub-assembly of wires produced as described above. To perform this assembly procedure, a wire is again positioned in the groove 74 closest to the edge 80 of the rig 70. The first and second rigs 70 and 72 are again moved into juxtaposition such that all the wires overlap and are oriented at relative angles of about sixty (60) degrees. At the points of intersection, the wires are then welded together. Welding can be done wire-by-wire, or in groups, as desired.

When welding of the wires is completed, the material 10 of the invention is removed from the rigs. The material 10 can then be further processed as desired.

The structural material 10 produced using the processes of the invention can be in isolation, as shown in FIG. 1. Alternatively, the structural material 10 can be corrugated, as depicted in FIG. 3, using, for example, a press, punch and die, or by passage through a set of saw-toothed rollers to form corrugated sheets. Preferably, the corrugated embodiment of the structural material 10 shown in FIG. 3 is produced by placing the flat structural material shown in FIG. 1 through a rolling press. The rolling press has a generally flat male portion and a curved female portion. The curved female portion tangentially contacts the flat male portion along a single line. In operation, the structural material 10 is bent along the line of contact between the male and female portions of the press. This configuration is preferred as it permits the structural material 10 to contract as it is bent.

The structural material 10 produced using the process of the invention can also be used to form a larger multi-laminate structure, as shown in FIGS. 4 and 5. In this embodiment, alternating layers of the flat structural material 10 of FIG. 1 is joined to the corrugated structural material 10 of FIG. 3. To form this material, the layers are first stacked together as shown in FIG. 4. Next, the loose material 10 is placed in the forge press and welded in accordance with the procedure set forth above in connection with the procedure for forming a single sheet of structural material 10.

The method of the invention also contemplates producing the material of the invention 10 using methodologies incorporating photo-etching, machining, or molding subprotocols. As noted above, these procedures are typically utilized in order to modify or produce a substrate sheet that is, in turn, used to produce the material 10 of the present invention.

In the case of photo-etching and machining, a substrate sheet having preselected dimensions is treated in order to produce a desired pattern of apertures. These apertures can have virtually any configuration, e.g., oval, square, trigonal, or circular, depending on the given application in which the lattice of the invention is to be utilized. Depending on the configuration of the apertures selected, the supports 12 can have virtually any configuration desired. The substrate sheets produced using these methods of the invention can be used in isolation to form the structural material 10 of the invention. Alternatively, the resulting substrate sheets can be bent using a press, punch and die, or by passage through a set of saw-toothed rollers to form corrugated substrate sheets. If desired, this latter material can be stacked with, and joined to, alternating flat substrate sheets to form a thicker three dimensional material. Alternatively, the bent substrate sheets can be stacked and joined to each other to form the desired three dimensional lattice of the invention.

Finally, in the case of molding of the substrate sheets, a desired material is heated and then extruded, injection molded, or poured to produce the substrate sheet. By carefully designing the configurations of the molds utilized in these processes, a substrate sheet having virtually any configuration can be produced so as to satisfy the structural requirements of an application in which the lattice of the invention is to be utilized. For example, both flat and bent substrate sheets can be produced during the pouring or molding processes. The substrate sheets produced using molding protocols can be used in isolation as a structural material. Alternatively, layers of the resulting sheets can be stacked to form a thicker three dimensional material.

The following is an illustrative, non-limiting example of the procedure for making a material of the invention.

EXAMPLE I

To commence the manufacturing procedure a section of wire was inserted into each of the grooves cut into the surface of a second support rig (FIG. 8B). A single wire was placed in the first groove of a first support rig (FIG. 8A). The wires placed in both rigs were manufactured from stainless steel, had a diameter of 0.008 inches, and were purchased from All Stainless Co., Hingham, Mass. Next, using a straight edge, the end of the wires positioned in the second rig were aligned such that each wire extended approximately 0.01 inches over the edge of the rig. The wires positioned in the second rig were then brought into contact with the single wire placed in the first rig. In particular, the wires were oriented such that the wires in the second rig were at a relative angle of sixty (60) degrees to the wire in the first rig.

In the next step of the procedure, an electrode was brought into contact with the wires in the second rig and the single wire in the first rig. More particularly, at each point of intersection an electrode was positioned such that it exerted a pressure of five (5) pounds on the wire junction. The electrode was connected to a power supply able to provide a controlled percentage of the wall current, ranging from one (1) to ninety-nine (99) percent in one (1) percent increments, for a controlled number of sixty (60) hertz cycles (each cycle being approximately 16.7 milliseconds), ranging from one (1) to seventy (70) cycles in one (1) cycle increments. Using the power supply, a current equal to fifty-five (55) percent of the standard wall current was then delivered to the intersection point for one (1) cycle. The procedure was repeated until all of the intersection points had been welded together.

In the final phase of the assembly procedure, the subassembly of the first and second wires was repositioned in the second rig. A third wire was then placed in the first rig. At each point of intersection, an electrode was again placed in contact with the wires such that it exerted a pressure of five (5) pounds on each wire junction. A current equal to about sixty-five (65) percent of the standard wall current was delivered to the intersection point for one (1) cycle using the power supply discussed above. The procedure was repeated until all of the intersection points had been welded together.

It will thus be seen that the invention efficiently attains the objects set forth above, among those made apparent from the preceding description. In particular, the invention provides a high strength light-weight structural material and an efficient method for its production.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A structural material comprising a lattice in the form a continuous array of substantially trigonal structures, said structural material being formed from a substrate having a pattern of apertures therein, said pattern of apertures being sized and shaped so as to form in said substrate said array of said substantially trigonal structures.

2. The lattice of claim 1 wherein said lattice is formed from a material selected from the group consisting of brass and stainless steel.

3. The lattice of claim 2 wherein said material forming said lattice has a thickness of between about 0.005 inches and about 0.01 inches.

4. The lattice of claim 3 wherein said material forming said lattice has a diameter of between about 0.008 inches.

5. A method for the manufacture of a structural material including a lattice, said lattice being in the form of a continuous array of substantially trigonal structures, said method comprising the steps of:

a.) providing a mold, said mold having a receiving aperture, said receiving aperture being configured so as to form said lattice;

b.) filling said receiving aperture with a material such that said material will form a substrate sheet in the form of said lattice;

c.) permitting said material to set such that said material retains the shape of said receiving aperture, said set material forming said substrate sheet having said shape of said lattice;

d.) releasing said substrate sheet from said mold once said material has set.

6. The method of claim 5 further including the step of welding a first substrate sheet to a second substrate sheet.

7. A structural material comprising a lattice in the form a continuous array of substantially trigonal structures, said structural material being formed from a first substrate, a second substrate, and a third substrate, said second substrate being positioned between said first substrate and said third substrate, said first substrate and said third substrate having a first pattern of apertures therein, said second substrate having a second pattern of apertures therein, said first pattern and said second pattern cooperating to form said lattice of said substantially trigonal structures when said first substrate, said second substrate, and said third substrate are connected so as to form said structural material.

8. The structural material of claim 7 wherein said first pattern of apertures is sized and shaped so as to form in said first substrate an array of planar substantially trigonal structures.

9. The structural material of claim 7 wherein said first pattern of apertures is sized and shaped so as to form in said third substrate an array of planar substantially trigonal structures.

10. The structural material of claim 7 wherein said second pattern of apertures is sized and shaped so as to form in said second substrate an array of planar substantially trigonal structures.

11. The structural material of claim 7 wherein said first pattern of apertures in said first substrate and said third substrate, and said second pattern of apertures in said second substrate, are substantially identical.

12. The structural material of claim 1 wherein said apertures in said substrate have a substantially trigonal configuration.

* * * * *